Patented June 23, 1942

2,287,244

UNITED STATES PATENT OFFICE 2,287,244

CATALYTIC COMPOSITION

Heinz Heinemann, Pampa, Tex., assignor to the firm Danciger Oil & Refineries, Inc., Tulsa, Okla.

No Drawing. Application December 19, 1940, Serial No. 370,738

18 Claims. (Cl. 252—199)

This invention relates to catalysts capable of increasing the velocity of various types of chemical reactions between organic compounds. In a more specific sense the invention has reference to catalytic compositions comprising a metal halide known in anhydrous form as a Friedel-Crafts agent with the addition of other suitable substances of the type described hereinafter. While capable of use for other purposes, the catalysts according to my invention have proven to be particularly effective in the conversion of normal hydrocarbons into the corresponding iso-compounds and also in the alkylation of iso-paraffins with olefins. Reference is made to my co-pending application Ser. No. 368,276, filed Dec. 3, 1940.

Friedel-Crafts agents, such as aluminum chloride, zinc chloride, aluminum-bromide, ferric chloride, and the like are known to be useful in accelerating various types of reactions among organic compounds, while they are only slightly effective in other reactions. It has also been suggested to use the Friedel-Crafts metal halides in combination with certain activators or promoters which, however, are corrosive and/or unstable compounds, the use of which causes inconveniences. I have now found that new and valuable catalytic compositions can be obtained by the joint use of a metal halide known in anhydrous form as a Friedel-Crafts catalyst and certain stable and non-corrosive compounds of the type disclosed hereinafter.

The catalytic compositions according to my invention comprise as an essential component, a metal halide known in anhydrous form as a Friedel-Crafts agent, such as aluminum chloride, zinc chloride, aluminum bromide, ferric chloride and the like, and, in admixture with the same, a suitable compound of antimony.

According to one preferred embodiment of this invention, I use said metal halide, wholly or partly dissolved in water and admix the same with an oxygen containing compound of pentavalent antimony, obtained as a precipitate, for example, by the action of antimony pentachloride on about an equal amount of water.

For instance, 114 grams of antimony pentachloride are added gradually to about an equal weight of water. This causes the formation of a white precipitate which probably consists of hydrates of antimony pentoxide. This product, however, may contain, besides the hydrates of antimony pentoxide, hydrolysis products of antimony trichloride. The presence of the lower chlorides of antimony may be surmised by the detection by odor of chlorine evolved during the reaction between the water and antimony pentachloride. The white precipitate is brought upon a filter and washed with water until the filtrate is substantially free from chlorine ion, and added, under agitation, to 1½ gallons of a 10% solution of zinc chloride in water. Better results may be obtained from catalytic compositions which contain concentrated solutions of zinc chloride, for example a zinc chloride solution which is saturated at the isomerization temperature. Such composition is, for example, obtained by admixing the product from the action of about 600 grams of water on 600 grams of antimony pentachloride with 1½ gallons of a solution of zinc chloride in water saturated at 250° F. Even better isomerization results may be obtained with a catalyst prepared under similar conditions with the addition of zinc chloride in excess of that required to produce the 1½ gallons of zinc chloride solution saturated at 250° F.

My catalytic composition may also be prepared by mixing a suitable antimony compound, such as $SbCl_5$ in the vapor phase with the organic compound or compounds to be treated, and bringing in contact the mixture thus obtained with an aqueous solution of the metal halide.

Moreover, in preparing my catalytic compositions, solid carriers, such as silica-gel, activated carbon, fuller's earth or alumina, etc., may be substituted for the greater proportion of the water. For example, 30 grams of zinc chloride is dissolved in 20 cc. of water and homogenized with a suspension of 6 grams of antimony compound suspended in 10 cc. of water, said antimony compound being obtained as described above by the action of water on antimony pentachloride. The mixture of zinc chloride solution and antimony compound is added in portions to 150 grams of silica gel, and agitated rapidly until the mixture is dry. A sufficient quantity of this catalyst is prepared in this manner to fill the reaction tower.

In carrying out my invention, instead of zinc chloride other metal halides known in anhydrous form as a Friedel-Crafts catalyst or agent, such as aluminum chloride, ferric chloride, aluminum bromide, or mixtures of several halides may be used. These metal halides may also be used in a form modified with an alkali metal halide, such as sodium chloride or an alkaline earth metal halide, such as calcium chloride or barium chloride.

The antimony compounds, as has already been described, are prepared by the action of water on antimony pentachloride. They may also be prepared in any other suitable manner, for instance by the treatment of antimony pentafluoride, antimony pentachloride hydrate or hydrochloric acid solution of antimony pentachloride with water, or by the decomposition of an aqueous solution of an antimonic acid salt with acid. A single compound of antimony or a mixture of several compounds may be used. Suitable antimony compounds are, for example, $Sb_2O_5.H_2O$, $Sb_2O_5.2H_2O$, $Sb_2O_5.3H_2O$, or the precipitates obtained by acidifying the aqueous solution of an antimonic acid salt, such as a salt of $H_3SbO_4$, $H_4Sb_2O_7$ or $HSbO_3$.

The ratio of zinc chloride or the like to the antimony compound may vary within wide limits, between 3:1 and 10:1, for example, the metal halide being in excess. The activity of the freshly prepared catalyst can be increased by mechanical stirring or similar steps causing the exposure of a greater surface to the organic compound treated.

In the case of the solid catalyst the carrier may consist of materials of siliceous character, such as artificially prepared porous silica, diatomaceous earth, kieselguhr, or other naturally occurring substances, such as fuller's earth or bentonite. Other carriers such as alumina, carbon in various forms and other absorptive materials are suitable as catalyst carriers.

The catalysts prepared in accordance with the present invention can be used in various types of reactions, such as condensation, alkylation or isomerization, and they are particularly effective in the isomerization of various classes of hydrocarbons. Mixtures of several hydrocarbons or mixtures of hydrocarbons with other organic or inorganic substances, may also be treated. These reactions may take place at their respective reaction temperatures in liquid, vapor, of mixed liquid-vapor phase. The reactions may be carried out with catalysts according to this invention under numerous combinations of temperature and pressure, the individual combinations depending on the nature of the organic compounds treated and on the composition of the individual catalyst used. The reactions may be carried out in both batch and continuous operation. Their velocity is influenced also by the relative amount of the catalytic composition used and by the ratio of its components.

A specific advantage of these compositions is their stability and substantially non-corrosive character. The effect of the catalysts produced according to this invention upon a given organic reaction is influenced by the composition of the catalyst and the procedure used in its preparation, and to a certain extent also by the carrier used. The specific procedure for using these catalysts in various reactions will be determined by the characteristics of the reaction components and the chemical reaction to be influenced by the catalyst.

As an example of one use of my invention I describe below the isomerization of normal butane in the presence of a zinc chloride and antimony compound catalyst. This example is, of course, illustrative only and is not to be interpreted as limiting the invention thereto.

A catalytic composition was prepared by adding to 1½ gallons of an aqueous solution of zinc chloride saturated at 250° F., the product obtained from 600 grams of antimony pentachloride and an equal amount of water in the above described manner. Preheated normal butane was passed, in a continuous operation, at the rate of three cubic feet per hour through this catalyst at about 250° F. under a gauge pressure of 50 lbs. per square inch. The resulting gas contained an average of 68.5% of isobutane which may be separated from normal butane by fractionation, and the latter recycled. If normal butane is treated under similar conditions with a catalyst consisting of an aqueous solution of zinc chloride without the addition of an antimony compound, substantially no isomerization is effected.

Another catalyst for converting normal butane into isobutane was obtained by adding to one gallon of an aqueous solution containing 379 grams zinc chloride, the antimony compounds obtained in the above described manner, from 68 grams of antimony pentachloride. This catalyst was added to a reaction vessel wherein ⅓ of a cubic foot of butane at ordinary temperature and pressure, was also introduced. The reaction vessel was sealed and the contents heated until the pressure was raised to 40 pounds per square inch. These conditions were maintained for one hour. The temperature was then allowed to drop to atmospheric conditions, and the gas was withdrawn to a receiver. This procedure was repeated twice more. The total resulting gas contained 70% iso-butane.

Likewise normal butane was vaporized and passed through the solid catalyst prepared as described above on a silica gel base at 250 deg. F. under a gauge pressure of 50 pounds per square inch at a specific velocity of 27 with the butane measured at ordinary temperatures and pressures. The average conversion in a single pass was 60%.

Water may be admixed with the butane entering the reaction chamber in a quantity substantially equal to that leaving the tower. This will insure uniformity of the catalyst.

Isomerization of normal paraffinic hydrocarbons in the presence of the catalysts prepared according to this invention may be carried out at temperatures between 100° F. and 400° F. and under various pressures and may take place simultaneously with another reaction, such as alkylation. Isomerization of normal butane is preferably carried out at a temperature of 150° to 250° F.

In my present specification and claims, the term "a metal halide known in anhydrous condition as a Friedel-Crafts agent" (or catalyst), is to be understood as including, in the anhydrous form or in the form of hydrates, $AlCl_3$, $ZnCl_2$, $FeCl_3$, $AlBr_3$, and other similar catalytically active metal halides, and mixtures of said halides.

While I have described above several embodiments of my invention, I desire to have it understood that these embodiments are only illustrative, and that various changes may be made without departing from the spirit of the invention, which is not limited to the examples and to the statements on the theory of the reactions disclosed except insofar as expressed in the accompanying claims.

I claim:

1. A catalytic composition containing water, and a metal halide known in anhydrous condition as a Friedel-Crafts catalyst, admixed with an oxygen containing compound of antimony selected from the group consisting of antimony compounds obtained by hydrolytic decomposition in aqueous solution, of a water-soluble compound of antimony, oxides and oxide hydrates of antimony, oxy-acids of antimony, and antimony compounds obtained by acidifying an aqueous solution of a salt of an antimonic acid.

2. A catalytic composition containing water, and a metal halide known in anhydrous condition as a Friedel-Crafts catalyst, admixed with a precipitate obtained by the action of water on a pentahalide of antimony.

3. A catalytic composition containing water, and a metal halide known in anhydrous condition as a Friedel-Crafts catalyst, admixed with a precipitate obtained by the action of water on antimony pentachloride.

4. A catalytic composition containing a metal halide known in anhydrous condition as a Friedel-Crafts catalyst, said metal halide being at least partly dissolved in water, admixed with an oxygen containing compound of antimony selected from the group consisting of antimony compounds obtained by hydrolytic decomposition in aqueous solution, of a water-soluble compound of antimony, oxides and oxide hydrates of antimony, oxy-acids of antimony, and antimony compounds obtained by acidifying an aqueous solution of a salt of an antimonic acid.

5. A catalytic composition containing a metal halide known in anhydrous condition as a Friedel-Crafts catalyst, said metal halide being at least partly dissolved in water, admixed with a precipitate obtained by the action of water on antimony pentachloride.

6. A catalytic composition containing water, and a metal halide known in anhydrous condition as a Friedel-Crafts catalyst, admixed with an oxygen containing compound of antimony selected from the group consisting of antimony compounds obtained by hydrolytic decomposition in aqueous solution, of a water-soluble compound of antimony, oxides and oxide hydrates of antimony, oxy-acids of antimony, and antimony compounds obtained by acidifying an aqueous solution of a salt of an antimonic acid, and a solid carrier substance.

7. A catalytic composition containing water, and a metal halide known in anhydrous condition as a Friedel-Crafts catalyst, admixed with a precipitate obtained by the action of water on antimony pentachloride, and a solid carrier substance.

8. A catalytic composition containing water, and zinc chloride admixed with an oxygen containing compound of antimony selected from the group consisting of antimony compounds obtained by hydrolytic decomposition in aqueous solution, of a water-soluble compound of antimony, oxides and oxide hydrates of antimony, oxy-acids of antimony, and antimony compounds obtained by acidifying an aqueous solution of a salt of an antimonic acid.

9. A catalytic composition containing water, and zinc chloride admixed with a precipitate obtained by the action of water on antimony pentachloride.

10. A catalytic composition containing zinc chloride at least partly dissolved in water, admixed with a precipitate obtained by the action of water on antimony pentachloride.

11. A catalytic composition containing an aqueous zinc chloride solution and an excess of undissolved zinc chloride, admixed with a precipitate obtained by treating antimony pentachloride with about an equal amount of water.

12. A catalytic composition containing water, and zinc chloride, admixed with an oxygen containing compound of antimony selected from the group consisting of antimony compounds obtained by hydrolytic decomposition in aqueous solution, of a water-soluble compound of antimony, oxides and oxide hydrates of antimony, oxy-acids of antimony, and antimony compounds obtained by acidifying an aqueous solution of a salt of an antimonic acid, and a solid carrier substance.

13. A catalytic composition containing water, and zinc chloride, admixed with a precipitate obtained by treating antimony pentachloride with about an equal amount of water, and a solid carrier substance.

14. A catalytic composition containing water, and zinc chloride admixed with a precipitate obtained by the action of water on antimony pentachloride, the ratio of zinc chloride to the antimony pentachloride being between 3:1 and 10:1.

15. A process for preparing a catalytic composition, said process comprising mixing a metal halide known in anhydrous condition as a Friedel-Crafts catalyst, said metal halide being at least partly dissolved in water, with an oxygen containing compound of antimony selected from the group consisting of antimony compounds obtained by hydrolytic decomposition in aqueous solution, of a water-soluble compound of antimony, oxides and oxide hydrates of antimony, oxy-acids of antimony, and antimony compounds obtained by acidifying an aqueous solution of a salt of an antimonic acid.

16. A process for preparing a catalytic composition, said process comprising mixing zinc chloride which is at least partly dissolved in water, with a precipitate obtained by treating antimony pentachloride with about an equal amount of water.

17. A process for preparing a catalytic composition, said process comprising mixing an aqueous zinc chloride solution and an excess of zinc chloride, with a precipitate obtained by antimony pentachloride with about an equal amount of water.

18. A process for preparing a catalytic composition, said process comprising mixing an aqueous zinc chloride solution with a precipitate obtained by treating antimony pentachloride with about an equal amount of water, mixing the product thus obtained with a solid carrier, and agitating the mixture formed until this mixture is dry.

HEINZ HEINEMANN.